Nov. 28, 1961

H. A. WISTRICH ET AL 3,010,804

FLUID MIXER WITH ROTATING BAFFLES

Filed June 21, 1956

INVENTORS:
HARRY A. WISTRICH
RICHARD B. OLNEY

BY: *Oswald H. Milmore*

THEIR ATTORNEY

United States Patent Office 3,010,804
Patented Nov. 28, 1961

3,010,804
FLUID MIXER WITH ROTATING BAFFLES
Harry A. Wistrich, Walnut Creek, and Richard B. Olney, Oakland, Calif., assignors to Shell Oil Company, a corporation of Delaware
Filed June 21, 1956, Ser. No. 592,948
6 Claims. (Cl. 23—270.5)

This invention relates to internally baffled, multistage fluid mixing apparatus suitable, for example, as reactors or as contacting apparatus to effect intimate contact between two or more at least partially immiscible fluid phases. When used as a reactor a single fluid phase may be passed through the central stages; the device then is a homogenous reactor. However, several phases may be flowed through the reactor concurrently. When used as a contacting device, e.g., to effect chemical reactions or for solvent extraction, two phases are present, and usually flow countercurrently through the several stages. All applications are herein generically referred to as fluid mixing apparatus.

Mixing apparatus of this type have a series of annular stator baffles having central openings and mounted at intervals transversely within an elongated vessel, which is usually vertical, and a rotor which includes a shaft extending through the said openings and carrying fast for rotation therewith a plurality of transverse, generally flat rotor baffles distributed among the compartments defined by the stator baffles and so mounted that they are axially spaced from the adjacent stator baffles, with which they cooperate to form mixing zones. Such apparatus is sometimes known as a rotating disc contactor. The general principles of construction and operation and the vortex patterns created by the baffles when used as a contactor are disclosed in U.S. Patents Nos. 2,601,674, 2,729,544 and 2,729,545 and will not be described in detail herein.

As is more completely set forth in the cited patents, the rotor baffles produce within the several compartments vortex patterns which cause one phase to be dispersed intimately within the other, and the dispersed and continuous phases gravitate into adjoining compartments in accordance with their relative densities. Such gravitating flow is satisfactory when the operation involves reasonably balanced net rates of flow of the two phases countercurrently through the vessel. In some operations, however, the net or throughput rate of flow of one of the phases, either the dispersed or the continuous one, is insufficient to maintain a composition gradient through the series of compartments when known constructions of the apparatus are used. For example, it was found that when one phase flows only intermittently or very slowly, such as at one-tenth of the flow rate of the other, excessive axial mixing occurs. The composition of the slowly moving phase then tends to become or becomes uniform throughout the several compartments, so that the contactor is in effect operating at a very small number of stages or as a single stage; this phenomenon occurs although the same contactor can be operated at a larger number of theoretical stages with the identical ratio of phases present within the vessel but with increased flow of the above-mentioned phase. The difficulty is especially severe in fluid systems that are difficult to mix; in such cases high mixing intensities produced, e.g., by high rotor speeds, are necessary but promote equalization of the composition throughout the several compartments.

The situation of low net rate of flow of one phase, considered in the preceding paragraph, is met with whenever a fluid stream is treated with a disproportionately smaller volume of a treating fluid, e.g., when hydrocarbon oil is treated with sulfuric acid or gasoline is treated with caustic.

Axial mixing is also a problem when the device is used as a reactor wherein only one phase occurs or wherein several phases flow concurrently, since any passage of fluid counter to the main flow direction results in unequal residence times for different parts of the reaction mixture.

It is a general object of the invention to overcome the above-noted difficulty by arranging the rotor and stator baffles in such a way as to limit axial mixing. Specific objects are to limit back-mixing of the slowly moving phase and thereby to increase the number of theoretical contacting stages realized when internally baffled apparatus of the type indicated is used as a contacting apparatus and the rate of throughput of one phase is excessively low in relation to the rate of throughput of the other phase, especially when a high mixing intensity is required; and to limit back-mixing of the fluid passing through the vessel when used as a homogenous or concurrent-flow reactor so as to effect a more uniform residence time.

In summary, according to the invention the general object is attained by positioning the stator and rotor baffles along the axis of the vessel so as to effect non-uniform axial intervals between adjacent pairs of cooperating baffles, one member of each said pair being a rotor baffle and the other a stator baffle. In the usual embodiment, wherein the stator baffles are equally spaced to provide compartments having equal axis dimensions, one or more of the rotor baffles is/are displaced axially from the mid-point or points of the enclosing compartment or compartments; all rotor baffles may be similarly displaced toward the same end of the vessel, or only some may be displaced toward one axial direction while the others may be situated centrally within their compartments and/or displaced in the opposite axial direction. In another arrangement the non-uniform intervals between cooperating baffles is achieved by applying a non-uniform spacing between the stator baffles; in this case the rotor baffles may, but need not, be mounted at the midpoints of their respective compartments, and this expedient is applied so that the interval between the members of a rotor-stator pair intermediate the ends of the shaft differs from the intervals in similar pairs situated distributively on opposite sides of the intermediate pair.

The axial positioning described in the foregoing results in different mixing intensities within the mixing zones of different axial dimensions. The zones of higher mixing intensities produce good contacting but tend toward high inter-compartment fluid intermixing rates, while the converse conditions prevail in the other zone.

The invention is founded on the observation that the tendency of a phase, such as the slowly-moving phase in a contacting operation, to become uniform throughout the series of contacting compartments is due to back-mixing, in which some of the said phase flows between compartments in the reverse axial direction, i.e., toward the end of the vessel at which it was admitted. When this axial mixing occurs at a rate that is high in relation to the net rate of flow or throughput rate of the phase in question, the composition is more or less equalized among all or several compartments. The rate of axial or back-mixing can be expressed in terms of the inter-compartment fluid intermixing rate, which is defined as the ratio of the reverse flow of a given fluid phase between adjacent compartments to the net forward flow of said phase through the vessel. It is evident that the same condition prevails in the case of a uniflow reactor; here reverse flow leads to a wider spread between the maximum and minimum residence times within the reactor.

It should be noted that the reduction of inter-compartment fluid intermixing brought about by the lower mixing intensities cannot be applied to advantage to all of the pairs of cooperating baffles due to the fact that the reduced mixing intensity and, in many cases, the resulting decreased capacity, have an adverse influence on the overall characteristics of the mixer. The instant invention purports to maintain good mixing or contacting conditions in at least certain zones of the vessel, herein called the high-intensity mixing zones, and to separate these zones from one another by others, herein called staging zones, which, although operating under somewhat less favorable mixing conditions, improve the overall operation by reducing back-mixing and thereby insuring the more uniform forward flow of all portions of the phase and the existence of different compositions in the several high-intensity mixing zones. The degree of composition difference to be attained can be varied by changing the extent to which the rotor baffle is displaced axially.

The invention will be described as applied to apparatus wherein all compartments have rotor discs, all rotor baffles are of like size and small enough to pass through the central openings in the stator baffles, and all stator baffles are alike; these are not, however, absolute requirements for the utility of the instant invention.

The invention will be described in further detail with reference to the accompanying drawing forming a part of this specification and showing certain preferred embodiments by way of example, wherein.

Figure 1:
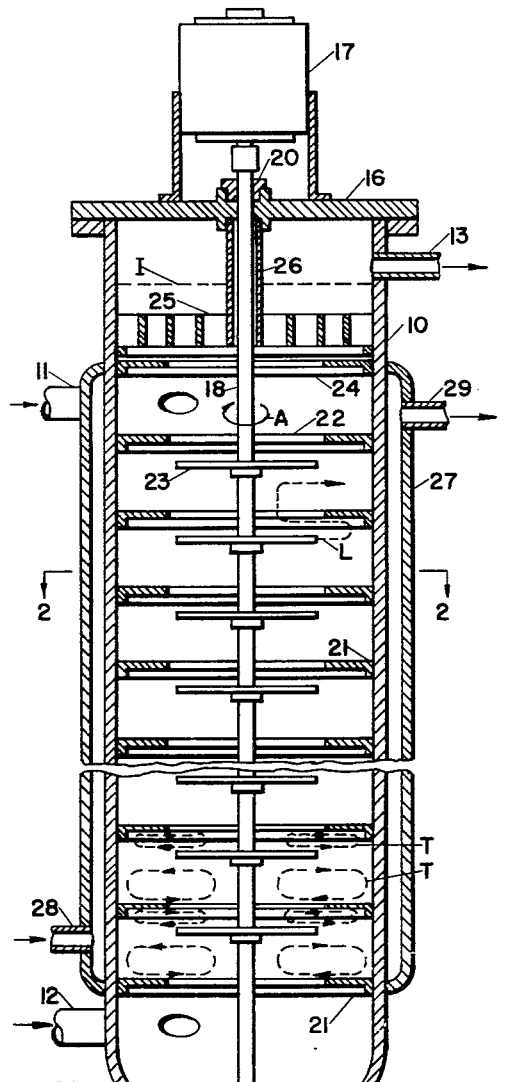
FIGURE 1 is a vertical sectional view of the contacting apparatus constructed in accordance with the invention.
Figure 2:
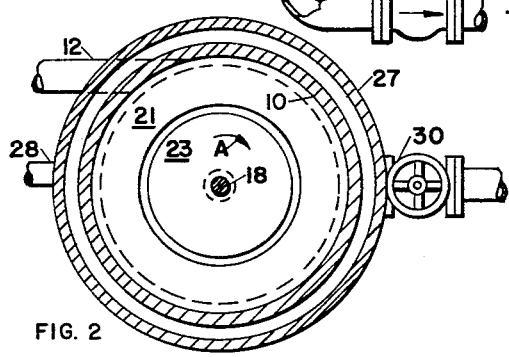
FIGURE 2 is a transverse sectional view taken on the line 2—2 of FIGURE 1.
Figure 3:
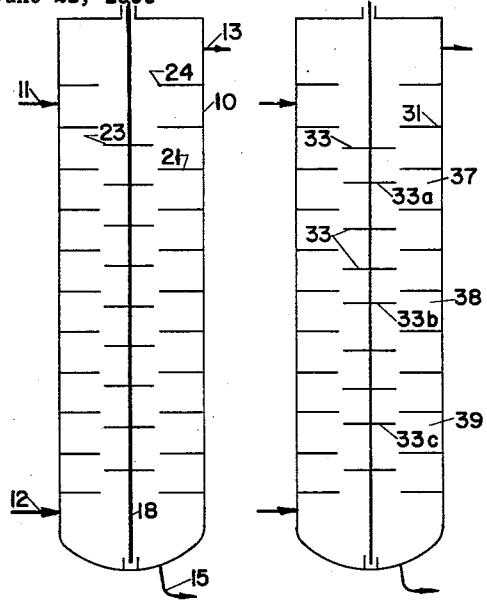
FIGURE 3 is a diagrammatic vertical sectional view showing the arrangement of the stator and the rotor baffles in accordance with the embodiment of FIGURES 1 and 2.

Referring to FIGURES 1, 2 and 3, the vessel includes a vertical cylindrical wall 10, circular in cross section, having upper and lower inlet pipes 11 and 12, respectively, which may optionally be tangential, as shown, an upper discharge pipe 13 and, in the bottom wall 14, a lower discharge pipe 15. The vessel is closed by a top plate 16 carrying an electric motor 17 which is coupled to a central, vertical shaft 18. This shaft is rotatably mounted in bearings 19 and 20. A plurality of horizontal, flat, annular stator baffles 21 is mounted immovably within the vessel at suitable intervals, which are equal in this embodiment. These baffles are imperforate except for central, circular openings 22, which are large in relation to the cross section of the shaft. The baffles 21 divide the vessel into a vertical series of compartments which communicate consecutively through said openings. The shaft 18 carries fixed thereto a plurality of rotor baffles 23 in the form of flat, circular, imperforate discs, the shaft and rotor baffles together constituting the rotor. In the embodiment being described the diameters of the openings 22 are equal, as are those of the baffles 23, the latter being somewhat smaller so that baffle 23 can be passed through the openings; however, these features are not in every case essential to the invention. A stator baffle 24 and a current-suppressing element such as an egg-crate structure 25 may be optionally mounted above the inlet 11. Further, a tube 26 may surround the upper part of the shaft 18. The vessel may have a jacket 27 fitted with pipes 28 and 29 for the circulation of a heating or cooling fluid.

Considering now the improvement according to this embodiment of the invention, it will be noted that each rotor baffle 23 is situated within a compartment in axially upwardly displaced relation to the mid-level of the enclosing compartment, but nonetheless in axially spaced relation to the nearer (higher) adjacent stator baffle, so as not to obstruct the opening 22.

Operation as a contactor is as follows: It is assumed that the heavier fluid is to form a continuous phase and that the lighter fluid is to be dispersed therein. The column is filled through inlet 11 with the heavier fluid, the shaft 18 is rotated by the motor 17 in a direction indicated by the arrow A (this being preferably the same as the tangential direction of the inlet pipes 11 and 12) and the lighter fluid is admitted continuously or intermittently through the inlet 12, the admission of heavier fluid at 11 being continued. Toroidal vortices T are thereby set up with each compartment, resulting in the dispersion of the lighter fluid in the heavier. The greater part of the dispersion is recirculated within the vortices and the balance gravitates from stage to stage. Thus, the net path for a particle of lighter fluid between compartments is as indicated by the dashed line L. These flow patterns are further described in the above-cited patents. The relatively quieter space beneath the lowermost baffle 21 contains only the heavier fluid, commingled above the inlet 12 with large bubbles or globules of the lighter fluid. The heavier fluid is discharged through the outlet at a rate controlled by the valve 30. The dispersion rising past the upper inlet 11 has the rotational movement thereof checked by the structure 25; this permits the dispersed droplets to settle above the interface I. The lighter fluid is withdrawn through the outlet 13 and the heavier fluid settles back through the structure 25, so that there is no net vertical flow thereof at this level.

As was noted earlier, when one of the fluid phases flows slowly or intermittently, back-mixing, i.e., axial mixing thereof in the reverse direction, would tend to equalize among the several compartments the composition of that phase if all pairs of adjacent stator baffles and rotor baffles were similarly related for rotor speeds sufficient for good mixing. This tendency is effectively counteracted by the instant arrangement in that each rotor baffle is related differently to the adjacent higher stator baffle than to the adjacent lower stator baffle, forming with them two mixing zones wherein different mixing intensities prevail. Thus, in the higher of these zones more intensive mixing prevails, but tends toward undesirably high axial mixing between compartments; the axial mixing is limited by the lower zones, wherein less intensive mixing and a reduced tendency toward axial mixing prevail. It is evident that the vessel is thereby divided into two series of zones, alternate zones being high-intensity mixing zones and the intervening zones being staging zones, wherein mixing occurs at a lower intensity. It may be noted that either the ascending, dispersed phase or the descending, continuous phase may be that which flows through the vessel at the lesser rate.

While the foregoing description pertained to the dispersal of the lighter fluid, it is evident that the invention is equally applicable to the case where the heavier fluid is dispersed, as is disclosed in the aforementioned patents. In this case the baffle 24 and structure 25 are mounted at the bottom, below the inlet 12, and the interface I is situated below the said structure. Dispersion of the heavier fluid is effected by admixing it only after the vessel has been filled with the lighter fluid.

It may be further noted that the invention may be applied to contactors of various forms, including particularly those with streamlining bodies or flat guide rings, in accordance with the above U.S. Patents, Nos. 2,729,544 and 2,729,545, respectively.

The additional views of the drawings illustrate diagrammatically certain specific modified arrangements whereby the relations between the stator baffles and the rotor baffles can be varied.

Figure 4:
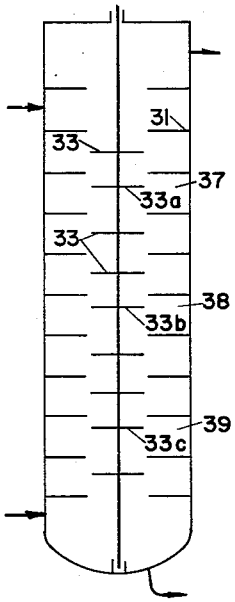
FIGURES 4, 5 and 6 are diagrammatic vertical sectional views showing three alternative arrangements of the stator and rotor baffles.

In the arrangement according to FIGURE 4, the stator baffles 31 are located as previously described for the baffles 21. The rotor baffles, which may be alike as to shape and size, are mounted on the rotor shaft at unequal intervals as follows: The rotor baffles 33a-b-c are displaced upwards from the mid-levels of the compartments 37, 38 and 39 and the other rotor baffles 33 are mounted at the mid-levels of their respective compartments. The compartments 37, 38 and 39 therefore constitute staging zones which limit axial mixing, and they divide the vessel into four high-intensity mixing zones, each comprising a consecutive series of pairs of adjacent stator and rotor baffles to elongate the high-intensity mixing zone. This arrangement is suitable particularly at relatively low rotor speeds, wherein a somewhat lower mixing intensity prevails but effective mixing is provided by the use of such a longer high-intensity mixing zone.

Figure 5:
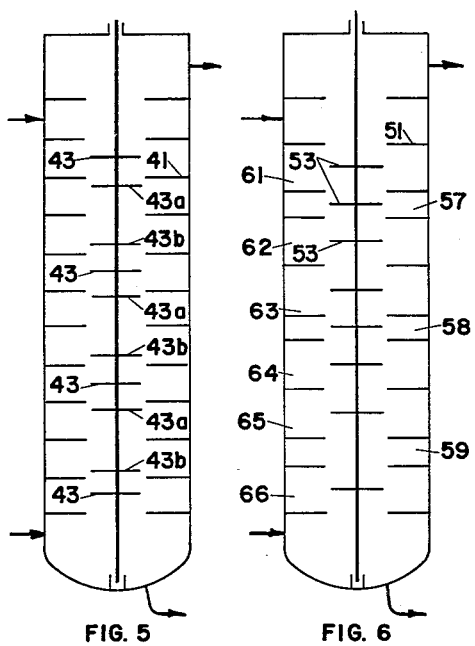

FIGURE 5 shows an arrangement wherein some rotor baffles are displaced toward each end of the vessel and others are disposed at the mid-levels. The stator baffles 41 are located and shaped as previously described for the baffles 21. The rotor baffles, which may be alike as to shape and size, fall into three groups: Baffles 43 are situated at baffles 43a are displaced upwards from and baffles 43b are displaced downwards from the mid-levels of their respective compartments. It will be noted that the baffles 43a and 43b are arranged in pairs, on opposite sides of certain stator baffles, so as to provide between them an elongated staging zone comprising two consecutive pairs of adjacent stator and rotor baffles which produce low-intensity mixing. These staging zones divide the vessel into four high-intensity zones, including respectively the compartments which contain the centered rotor baffles 43, and portions adjoining compartments. This arrangement provides staging zones which attain a more effective differentiation of composition between high-intensity mixing zones and is suitable, for example, at higher rotor speeds.

Figure 6:
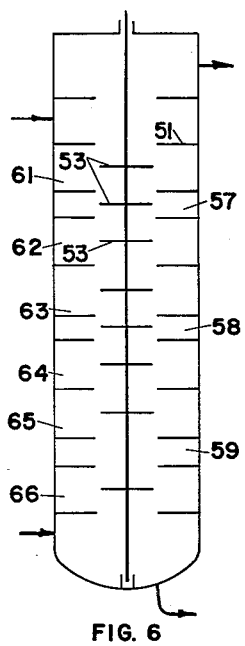

FIGURE 6 illustrates an embodiment wherein the non-uniform axial spacing is achieved by altering the intervals between the stator baffles, and each rotor baffle 53 may be mounted midway between the adjacent stator baffles. The stator baffles 51 are alike in shape and size but are mounted at vertical intervals such that the compartments 57, 58 and 59 have smaller heights than the other compartments 61–66. The rotor discs are mounted at the mid-levels of their respective compartments. In this embodiment the compartments 61–66 form staging zones, dividing the vessel into three high-intensity zones, 57, 58 and 59 respectively. The application of this arrangement is as stated above for FIGURE 5.

The same considerations apply when the device is used as a reactor. Thus, when used as a homogeneous reactor only one set of flow connection, 12 and 13 or 11 and 15, is needed, and the rotor is used for the purpose of mixing the reacting stream to establish within each compartment uniformity in composition and temperature, the latter being controlled by the temperature of fluid circulated within the jacket 27.

We claim as our invention:

1. A fluid mixing apparatus comprising: an axially elongated vessel; a plurality of transverse, axially spaced annular stator baffles fixed within said vessel, having opposed faces and central openings, and defining a series of compartments which are in consecutive communication through said openings; means for admitting a fluid to the vessel at one end of the series and for discharing the fluid at the other end of the series; and a rotor including a rotatably mounted shaft extending through said openings with ample radial clearances with respect to the stator baffles for the free passage of fluid through said openings and carrying fast for rotation therewith a plurality of generally flat rotor baffles, each rotor baffle being situated alone in one of said compartments in axially spaced relation to the stator baffles, opposite faces of the rotor baffles being in proximity to the faces of adjacent stator baffles and cooperating therewith to form mixing zones, said rotor baffles being arranged in pairs in adjoining compartments, the baffles of the same pair being displaced in opposite directions from the midpoints within their respective compartments, whereby the axial intervals between said rotor baffles and the stator baffles are varied recurrently, to interpose a mixing zone having low mixing intensity between mixing zones having high mixing intensities, thereby limiting back-mixing.

2. A fluid mixing apparatus comprising: an axially elongated vessel one end of which is higher than the other; a plurality of transverse, predominantly flat, axially spaced, annular stator baffles fixed within said vessel, having opposed faces and central openings, and defining a series of compartments which are in consecutive communication through said openings; means for admitting fluid to the vessel at one end of the series and for discharging the fluid at the other end of the series; and a rotor including a rotatably mounted shaft extending through the said openings with ample radial clearances with respect to the stator baffles for the free passage of fluid through said openings and carrying fast for rotation therewith a plurality of essentially flat, circular rotor baffles distributed among a plurality of said compartments and situated in axially spaced relation to the stator baffles, the opposed faces of said rotor baffles being in proximity to and forming mixing zones with the respectively adjacent faces of the stator baffles, at least one intermediate compartment having the rotor baffle faces situated at unequal distance from the respectively adjacent faces of the stator baffles, to interpose a mixing zone of low mixing intensity between mixing zones having high mixing intensities, thereby limiting back-mixing.

3. A fluid contacting apparatus comprising: a vertically elongated vessel shaped internally as a surface of revolution about a vertical axis; a plurality of horizontal, essentially flat, annular stator baffles fixed within said vessel and extending at vertical intervals from said interior surface radially to central, circular openings, said baffles defining a series of compartments which are in consecutive communication through said openings; means for admitting fluids to be contacted at vertically spaced points in said vessel for countercurrent flow through said compartments and for discharging the fluids after such countercurrent flow; a shaft extending through said openings with ample radial clearances with respect to the stator baffles for the free passage of fluid through said openings; means mounting said shaft for rotation; a horizontal, substantially flat, circular rotor baffle for each of said compartments mounted on said shaft for rotation therewith at locations spaced by substantial distances from the adjacent higher and lower stator baffles, the opposed faces of said rotor baffles being in proximity to and forming mixing zones with the respectively adjacent faces of the stator baffles, at least one of said rotor baffles which is intermediate the uppermost and lowermost rotor baffles being displaced vertically from the mid-level between the adjacent higher and lower stator baffles, to interpose a mixing zone of low mixing intensity between mixing zones having high mixing intensities, thereby limiting back-mixing.

4. A fluid contacting apparatus according to claim 3 wherein a plurality of said rotor baffles, distributed along the length of the shaft, are displaced vertically from the mid-levels between the respectively adjacent stator baffles.

5. A fluid contacting apparatus according to claim 4 wherein all rotor baffles are displaced vertically as specified, the displacement of all baffles being in a common vertical direction.

6. A fluid contacting apparatus according to claim 3 wherein some rotor baffles which lie distributively on opposite sides of said intermediate rotor baffle are situated substantially at the mid-levels between the respectively adjacent stator baffles.

References Cited in the file of this patent

UNITED STATES PATENTS

| | | |
|---|---|---|
| 1,208,534 | Foret | Dec. 12, 1916 |
| 2,091,645 | McConnell | Aug. 31, 1937 |
| 2,601,674 | Reman | June 24, 1952 |